May 15, 1962 R. H. DAVIDSON 3,034,246
FISH SENSING DEVICE
Filed March 14, 1960
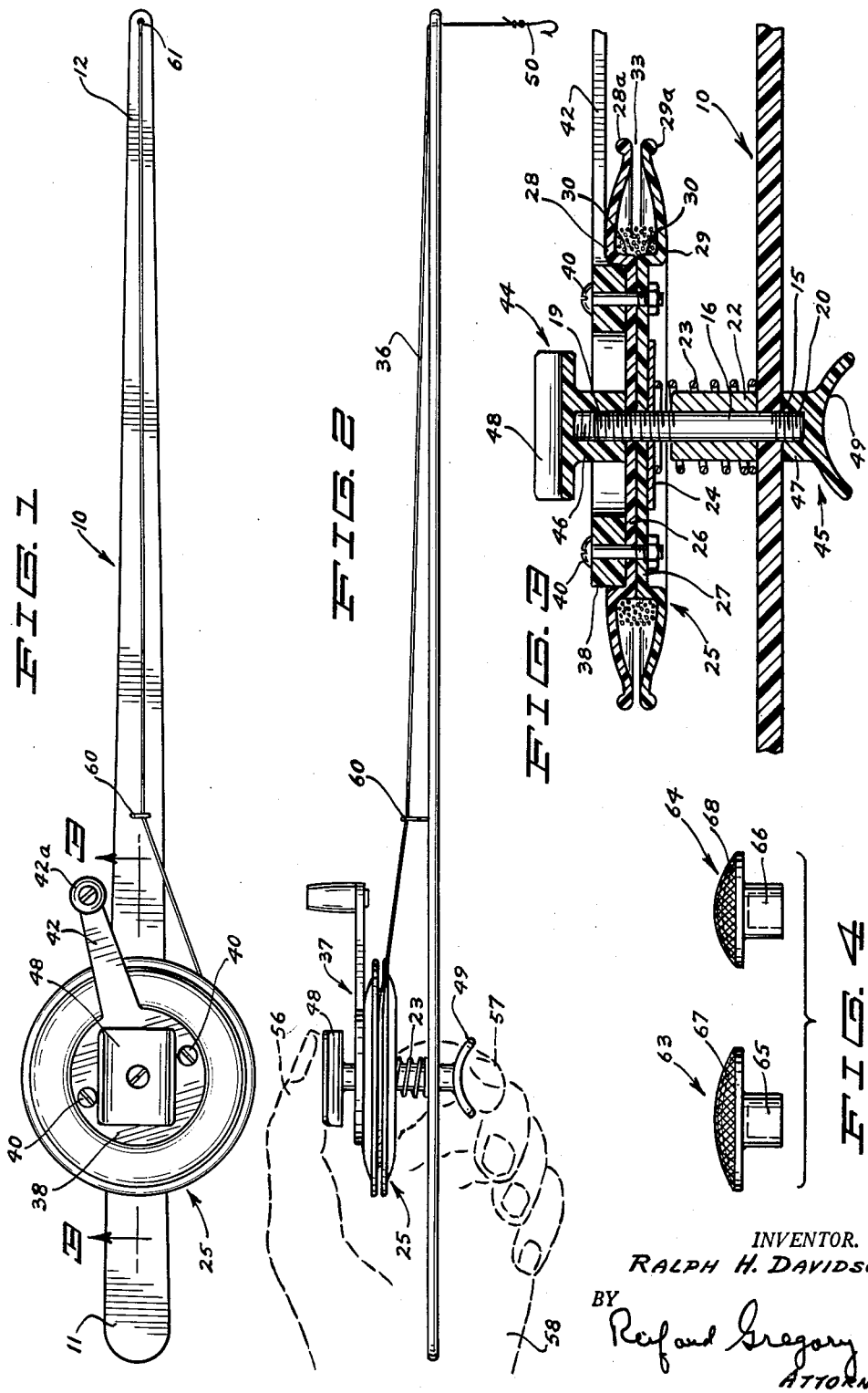
INVENTOR.
RALPH H. DAVIDSON
BY
ATTORNEYS United States Patent Office 3,034,246
Patented May 15, 1962

3,034,246
FISH SENSING DEVICE
Ralph H. Davidson, 26 18th Ave. S., Hopkins, Minn.
Filed Mar. 14, 1960, Ser. No. 14,779
1 Claim. (Cl. 43—17)

This invention relates to an improvement in a fishing device. In the usual practice of fishing, as in casting, still fishing, or trolling, the fisherman generally does not become aware of the presence of a fish until the fish has seized the hook on the fish line and has jerked the hook with sufficient force to perceptibly tug the fish line or cause the float which may be on the fish line to bob. In many fishing areas fish are reluctant to seize a hook, whether it be baited, or whether it be bare as in connection with an artificial lure, and in effect might just nuzzle the hook or slightly nudge it, and often live bait is nibbled away without the presence of the fish being detected owing to the insensitivity of the fishing device used.

It is desirable therefore to have a fishing device which is adapted to sense the presence of a fish by being responsive to the slightest disturbance of the fish hook.

It is an object of this invention therefore to provide a sensing fishing device adapted to be responsive to the slightest disturbance of a fishing hook suspended therefrom.

It is a further object of this invention to provide a sensing fishing device adapted to be held in operating position in a sensitively held balanced position whereby said device is responsive to a very slight degree of pressure applied thereto, such as would result from the nudging of a fish hook suspended therefrom.

It is another object of this invention to provide a sensing fishing device formed of a flexible rod of relatively short length adapted to be responsive to a very slight degree of pressure and adapted to be held by the operator in a balanced operating position between the tips of his thumb and forefinger whereby the operator becomes aware of the slightest disturbance affecting said device.

It is a more specific object of this invention to provide a sensing fishing device formed of a flexible rod of relatively short length adapted to be responsive to a very slight degree of pressure, and a holding means in association with said rod disposed therethrough at a point thereon for holding said rod in a balanced position and said means being adapted to be held very nicely sensitively between the tips of the thumb and forefinger of the operator.

It is a still more specific object of this invention to provide a sensing fishing device comprising a flexible rod of relatively short length adapted to flex responsive to a slight degree of pressure, said rod being tapered toward one end, a shaft disposed through said rod at right angles to the axis thereof at a balance point longitudinally of said rod, means for holding a fishing line mounted on said shaft and finger gripping portions at either end of said shaft adapted to be engaged by the tips of the thumb and forefinger of the operator to hold said rod in a balanced position whereby a slight disturbance of the hook and line in fishing position suspended by said rod will be sensed by said operator.

These and other objects and advantages of the invention will be fully set forth in the following description made in connection with the accompanying drawings in which like reference characters refer to similar parts throughout the several views and in which:

FIG. 1 is a top plan view of applicant's device;

FIG. 2 is a view of applicant's device in side elevation showing the same held in operating position;

FIG. 3 is a view on an enlarged scale in vertical section taken on line 3—3 of FIG. 1 as indicated by the arrows; and FIG. 4 shows a modification of a portion of applicant's device.

Referring to the drawings, applicant's device is shown comprising a rod 10, which in the embodiment of the invention here presented is formed of flat strap-like material of relatively narrow width having a handle end portion 11 and tapering to a free end portion 12. Said rod will be formed of a material sufficiently resilient to flex responsive to a very slight disturbance at its free end portion 11 and tapering to a free end portion 12. Said rod will be formed of a material sufficiently resilient to flex responsive to a very slight disturbance at its free end portion. Said rod is preferably relatively short in length with a length of fourteen inches having been found to be desirable.

A cylindrical shaft 16 is disposed through said rod at right angles to the axis thereof through an aperture 15 therethrough with said aperture being located at a balance point longitudinally of said rod. Said shaft has threaded portions 19 and 20 respectively at either end thereof with said threaded portion 20 being here shown extending for a short distance through and below said rod 10.

Disposed over said shaft and resting on said rod is a sleeve 22 having disposed thereover and extending somewhat thereabove a coiled spring 23. Mounted on said shaft above said coiled spring is a fish line holding member 25. Disposed between said spring 23 and said member 25 is a washer 24. Said member 25 may be variously formed and is here shown comprising a pair of disc-like members 26 and 27 having mating central body portions and having offset inclined circumferential flange portions 28 and 29 respectively forming a shoulder portion 30 and converging outwardly to the point of having a small annular slot-like opening 33 therebetween, as shown in FIG. 3. Thus there is formed a reel for receiving a fish line 36 through said slot 33 to be wound about said shoulder 30. Said flanges 28 and 29 are respectively shown having beaded outer end portions 28a and 29a respectively. A handle 37 having a flat ring-like body portion 38 overlies the body portion 26 and is secured to said disc-like members 26 and 27 by bolts 40 making said members 25 and 37 integral. An arm 42 extends outwardly of said central ring-like portion 38 having an upstanding knob 42a at the free end thereof for rotation of said member 25.

Respectively threaded onto either end of said shaft 16 are finger gripping members 44 and 45 having interiorly threaded stem portions 46 and 47. Said upper member 44 is rotated to easily control the amount of spring pressure placed against said member 25 to make it more or less easily rotatable. Said finger gripping members 44 and 45 may be variously formed. They provide a convenient rest for the tip portions of the thumb and forefinger of the operator so that said rod 10 may be held in a nicely nad sensitively balanced position so that the operator will instantly sense any disturbance at the free end of said rod, such as will be caused by a fish nudging a hook 50 at the end of line 36. In the embodiment of the invention here presented, said finger gripping members are shown having saddle-like upper portions 48 and 49 which will be respectively positioned, as indicated in FIG. 2, to comfortably accommodate the finger portions 56 and 57 of the operator's hand 58.

A line guide 60 will be secured to said rod 10 at a convenient point thereon with an aperture 61 at the free end of said rod 10 providing a second line guide through which the fishing line 36 will be disposed.

In operation, a sufficient length of line 36 will be unwound from the line-holding member 25 and will have a hook 50 at the free end thereof which may take any form that may be desired by the operator. The line-holding member 25 is intended for the storage of the line only and not for casting purposes. The finger gripping members 44 and 45 will be positioned, as indicated in FIG. 2, and will be held in a balanced position by the operator, as indicated in FIG. 2. Thus the rod 10 is normally held in a horizontal position with the reel 25 being horizontally disposed and the shaft 16 vertically disposed. The essential novel element in the use of this rod is in having the finger gripping portions 44 and 45 carried on said shaft 16 located at the point longitudinally of said rod 10 where the rod will be nicely balanced between the fingers of the operator so that the operator will become aware of the slightest disturbance affecting the free end of said rod 10, such as a very slight tug at the end of line 36 or even the nudge of a fish hook by a fish. Thus the members 44 and 45 form the handle or the hand holding portion of the rod. Both the resilient nature of the rod and the sensitive manner in which it is held by the operator contributes to make the applicant's device a very nice sensing device. The theory here is that the operator does not await a bite onto the baited hook on the part of a fish, but actually in sensing the presence of the nibbling fish the hook is snapped upwardly manually with a quick jerk to hook the fish.

A modification of the finger gripping members 44 and 45 is shown in FIG. 4 wherein finger gripping members 63 and 64 have interiorly threaded stem portions 65 and 66 and finger engaging head portions 67 and 68 shown as being convexly curved and having knurled surfaces for good frictional engagement by the finger tips of the operator as above indicated without the application of an undue amount of pressure.

Thus it is seen that I have provided a very simply constructed unusually sensitive fish sensing device which has proved to be very successful in operation.

It will of course be understood that various changes may be made in the form, details, arrangement and proportions of the parts, without departing from the scope of applicant's invention, which, generally stated, consists in a device capable of carrying out the objects above set forth, in the parts and combinations of parts disclosed and defined in the appended claim.

What is claimed is:

A sensing fishing device having in combination, a relatively short tapered flexible rod having its tapered end sensitive to a very slight degree of pressure and being normally disposed in a horizontal plane, a shaft vertically disposed through said rod at right angles to the longitudinal axis thereof, a disc-like reel carrying a fishing line mounted on said shaft, said shaft and reel being positioned on said rod at the point of balance longitudinally of said rod, and a saddle nut at each end of said shaft with the respective longitudinal axes of said nuts at right angles to one another to be held between the thumb and forefinger of the operator to hold said rod in a sensitively balanced operating position.

References Cited in the file of this patent

UNITED STATES PATENTS

| | | |
|---|---|---|
| 346,490 | Medley | Aug. 3, 1886 |
| 569,128 | Guild | Oct. 6, 1896 |
| 2,038,344 | Clarke | Apr. 21, 1936 |
| 2,180,323 | Maxwell | Nov. 14, 1939 |
| 2,541,183 | Abele | Feb. 13, 1951 |
| 2,561,237 | Shafer | July 17, 1951 |
| 2,753,645 | Wood | July 10, 1956 |

FOREIGN PATENTS

| | | |
|---|---|---|
| 114,364 | Sweden | June 26, 1945 |